(12) United States Patent
Matsuki

(10) Patent No.: US 9,052,568 B2
(45) Date of Patent: Jun. 9, 2015

(54) LIGHT CONTROL APPARATUS

(71) Applicant: OLYMPUS CORPORATION, Tokyo (JP)

(72) Inventor: Kaoru Matsuki, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 2 days.

(21) Appl. No.: 14/186,148

(22) Filed: Feb. 21, 2014

(65) Prior Publication Data

US 2014/0169780 A1 Jun. 19, 2014

Related U.S. Application Data

(63) Continuation of application No. PCT/JP2012/074724, filed on Sep. 26, 2012.

(30) Foreign Application Priority Data

Sep. 30, 2011 (JP) ................. 2011-217499

(51) Int. Cl.
*G03B 9/02* (2006.01)
*G03B 11/00* (2006.01)

(52) U.S. Cl.
CPC .......... *G03B 9/02* (2013.01); *G03B 2205/0069* (2013.01); *G03B 11/00* (2013.01)

(58) Field of Classification Search
CPC ............ G03B 9/04; G03B 9/02; G02B 26/02; G02B 5/005
USPC .......... 396/508, 506, 457, 463, 469; 348/363; 359/738–740
See application file for complete search history.

(56) References Cited

U.S. PATENT DOCUMENTS

| 5,418,588 | A | * | 5/1995 | Chigira | ......................... 396/463 |
| 2010/0027094 | A1 | | 2/2010 | Ide | |
| 2010/0253992 | A1 | * | 10/2010 | Okita | ............................ 359/230 |

FOREIGN PATENT DOCUMENTS

| JP | Hei 09-022042 A | 1/1997 |
| JP | 2002-116478 A | 4/2002 |
| JP | 2003-111367 A | 4/2003 |
| JP | 2010-039030 A | 2/2010 |

OTHER PUBLICATIONS

International Search Report dated Dec. 18, 2012 issued in PCT/JP2012/074724.
International Preliminary Report on Patentability from related International Application No. PCT/JP2012/074724, dated Apr. 10, 2014, together with an English language translation.

* cited by examiner

*Primary Examiner* — Rochelle-Ann J Blackman
(74) *Attorney, Agent, or Firm* — Scully, Scott, Murphy & Presser, PC

(57) ABSTRACT

The apparatus includes an upper substrate and a lower substrate, each of which has an optical aperture, at least one light control unit, a spacer arranged between the upper substrate and the lower substrate to provide a space in which the light control unit can move, and a drive unit arranged on the upper substrate to drive the light control unit. The drive unit includes a magnet arranged at a center of rotation of the light control unit and an electromagnetic drive source including a coil core and a winding coil, the coil core being arranged in such a way as to be opposed to the magnet. A positioning member is provided on the upper substrate. The distance between the coil core and the magnet is kept constant by the positioning member.

7 Claims, 9 Drawing Sheets

200

LIGHT CONTROL APPARATUS

CROSS REFERENCE TO RELATED APPLICATIONS

The present application is a continuation of PCT/JP2012/074724, filed on Sep. 26, 2012, which is based upon and claims the benefit of priority from Japanese Patent Application No. 2011-217499, filed on Sep. 30, 2011, the entire contents of each of which are incorporated herein by reference.

TECHNICAL FIELD

The present invention relates to a light control apparatus.

BACKGROUND ART

With improvements in the performance of portable devices having an image pickup function and small-size optical apparatuses such as micro video scopes in recent years, there are demands for improvements of the optical components such as lenses, stops and optical filters used therein. Specifically, there are increasing demands for replacement of conventional fixed focal length lenses, fixed aperture stops, and optical filters having fixed characteristics respectively with adjustable focus lenses, variable stops, and optical filters having variable characteristics, and various techniques for reducing the sizes of optical components used in small-size image pickup devices have been developed.

FIG. 9 is a plan view showing the construction of a conventional electromagnetic driving apparatus. In the electromagnetic driving apparatus shown in FIG. 9, which is taught by patent literature 1, a taking lens 902 is held by a base plate 901, and a coil core (yoke) 903 arranged around the taking lens 902 and a magnet (permanent magnet) 905 form a closed magnetic circuit. The two ends 903a, 903b of the coil core 903 are opposed to the magnet 905. A winding coil 904 for energizing is wound around the coil core 903. The arrangement of the winding coil on the base plate in this construction allows a reduction in the diameter of the apparatus.

CITATION LIST

Patent Literature

Patent Literature 1: Japanese Patent Application Laid-open Publication No. 9-22042

SUMMARY OF INVENTION

The present invention provides a light control apparatus characterized by comprising: an upper substrate and a lower substrate, each of which has an optical aperture; at least one light control unit; a spacer arranged between the upper substrate and the lower substrate to provide a space in which the light control unit can move; and a drive unit arranged on the upper substrate to drive the light control unit, wherein the drive unit includes a magnet arranged at a center of rotation of the light control unit and an electromagnetic drive source including a coil core and a winding coil, the coil core being arranged in such a way as to be opposed to the magnet, a positioning member is provided on the upper substrate, the distance between the coil core and the magnet is kept constant by the positioning member.

In the light control apparatus according to the present invention, it is preferred that the positioning member restrict the position of the coil core in a direction in the plane of the upper substrate.

In the light control apparatus according to the present invention, it is preferred that the positioning member include two positioning members.

In the light control apparatus according to the present invention, it is preferred that the positioning member include a projection provided on the upper substrate and a hole provided in a portion of the coil core, and that positioning be attained by fitting the projection into the hole of the coil core.

In the light control apparatus according to the present invention, it is preferred that the positioning member include a projection extending along an optical axis direction on the upper substrate and exist on both sides of the magnet, and that positioning of the coil core be attained by abutting the coil core on a side surface of the positioning member.

In the light control apparatus according to the present invention, it is preferred that the projection of the positioning member be arranged in the vicinity of the magnet.

In the light control apparatus according to the present invention, it is preferred that the projection of the positioning member be made of a magnetic material.

ADVANTAGEOUS EFFECTS OF INVENTION

The light control apparatus according to the present invention is advantageous in that the distances between the magnet and the two ends of the coil core are uniform to enable stable operation.

DESCRIPTION OF EMBODIMENTS

In the following, embodiments of the light control apparatus according to the present invention will be described in detail with reference to the drawings. It should be understood that the embodiments described in the following are not intended to limit the present invention.

(Basic Construction)

Figure 1:
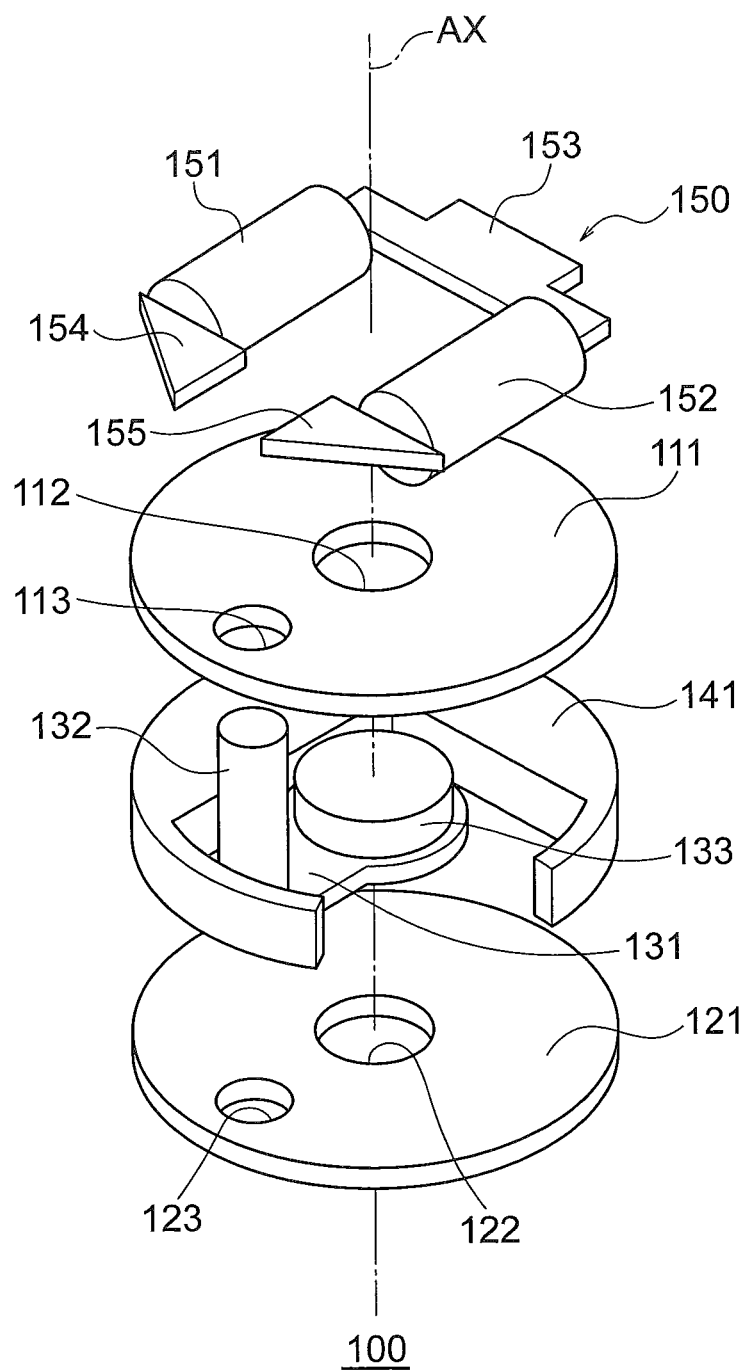
FIG. 1 is an exploded perspective view showing the basic construction of a light control apparatus.
Figure 2:
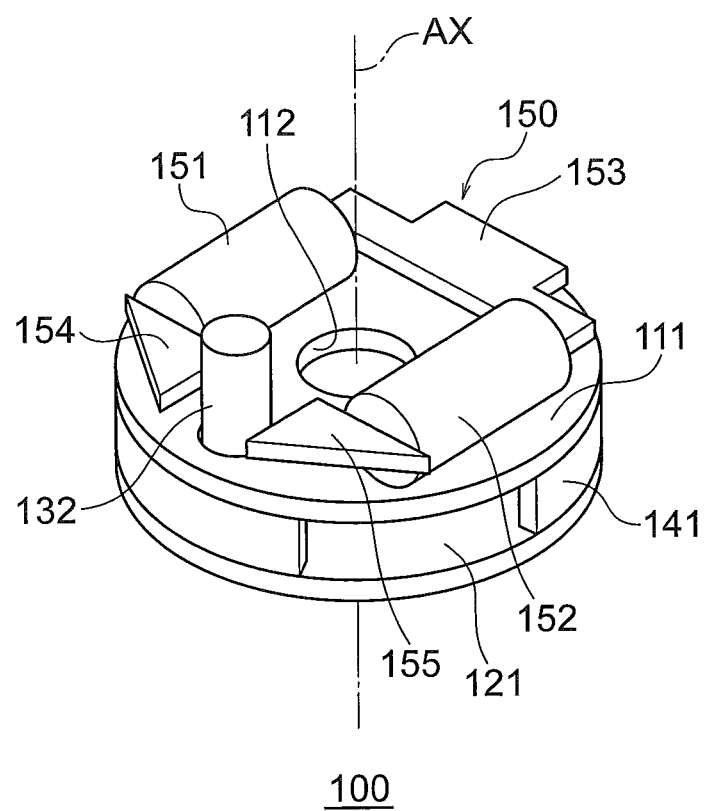
FIG. 2 is a perspective view showing the basic construction of the light control apparatus.

In the following, the basic construction of a light control apparatus will be described with reference to FIGS. 1 and 2. FIGS. 1 and 2 show the basic construction of a light control apparatus 100. FIG. 1 is an exploded perspective view, and FIG. 2 is a perspective view of the light control apparatus 100 in the assembled state.

The light control apparatus 100 includes an upper substrate 111 having an optical aperture 112 and a rotary shaft hole 113, a lower substrate 121 having an optical aperture 122 and a rotary shaft hole 123, a drive blade 131 serving as a light control unit on which an incident light control member 133 is arranged, a spacer 141 arranged between the upper substrate 111 and the lower substrate 121 to provide a space allowing rotation of the drive blade 131, and an electromagnetic drive source 150 that rotationally drives the drive blade 131.

The upper substrate 111 and the lower substrate 121 are arranged in order along an optical axis AX in such a way that the optical aperture 112 provided at the center of the upper substrate 111 and the optical aperture 122 provided at the center of the lower substrate 121 are arranged concentrically on the optical axis AX.

A magnet 132 functioning as a rotary shaft 132 is directly attached to the rotational center of the drive blade 131. The drive blade 131 is arranged between the upper substrate 111 and the lower substrate 121. The magnet 132 is magnetized in a radial direction. The lower end part of the magnet 132 is fitted in the rotary shaft hole 123 of the lower substrate 121, and the upper end part of the magnet 132 passes through the rotary shaft hole 113 of the upper substrate 111 so that the magnet 132 extends along the optical axis AX.

The incident light control member 133 is, for example, a lens or a filter. The incident light control member 133 may be constructed as a stop having an optical aperture instead of a lens or a filter.

The electromagnetic drive source 150 includes a substantially rectangular U-shaped coil core (yoke) 153 and winding coils 151, 152 wound thereon. Two end parts 154, 155 of the coil core 153 are opposed to each other. The electromagnetic drive source 150 is arranged on the upper substrate 111 in such a way as to surround the optical aperture 112. The upper part of the magnet 132 passing through the rotary shaft hole 113 is located between and opposed to the two end parts 154, 155 of the coil core 153.

The electromagnetic drive source 150 and the magnet 132 constitute a drive unit. In this drive unit, since the coil core 153 and the magnet 132 form a closed magnetic circuit, a strong magnetic force is generated. The drive blade 131 is driven by the drive unit. More specifically, as certain currents are supplied to the winding coils 151, 152, the magnet 132 disposed between the end parts 154, 155 rotates about its axis. This rotation causes the drive blade 131 to swing about the magnet 132 between a first stopping position and a second stopping position in a plane perpendicular to the direction of the optical axis AX to change the position of the incident light control member 133.

When the drive blade 131 is at the first stopping position, the incident light control member 133 is located at a position at which it is kept away from the optical aperture 112 of the upper substrate 111 and the optical aperture 122 of the lower substrate 121. In this state, the drive blade 131 abuts on the inner wall of the spacer 141 to be kept stationary at the position. In this state, light incident on the optical aperture is not controlled regulated by the light control member 133.

On the other hand, when the drive blade 131 is at the second stopping position, the incident light control member 133 is located at a position at which it overlaps the optical aperture 112 of the upper substrate 111 and the optical aperture 122 of the lower substrate 121. In this state, the drive blade 131 abuts on the inner wall of the spacer 141 to be kept stationary at the position. In this state, light incident on the optical aperture is controlled or regulated by the light control member 133.

(First Embodiment)

Figure 3:
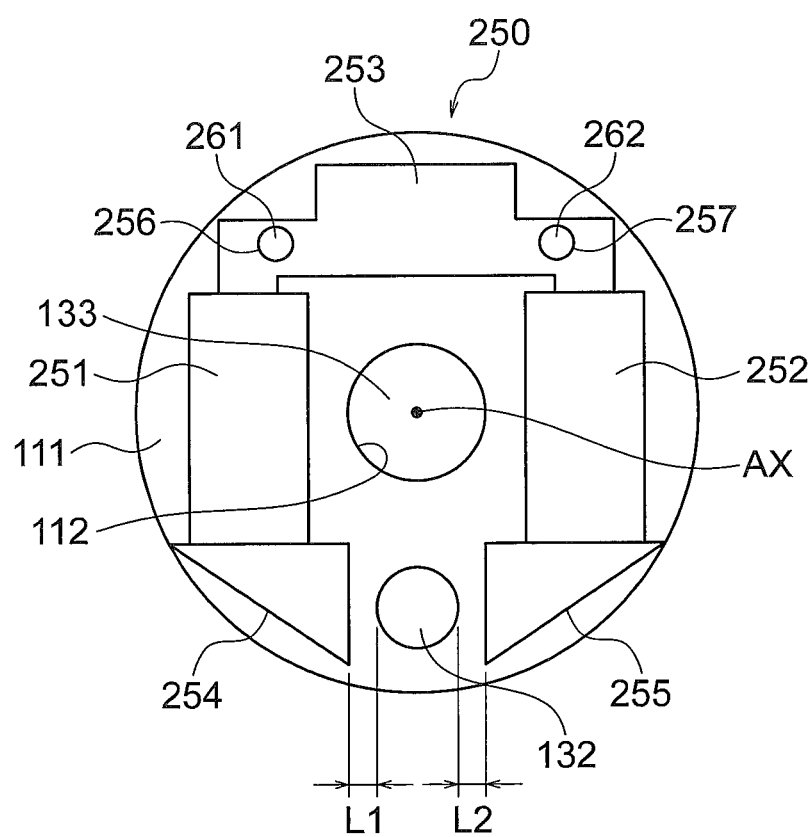
FIG. 3 is a plan view showing the construction of a light control apparatus according to a first embodiment.
Figure 4:
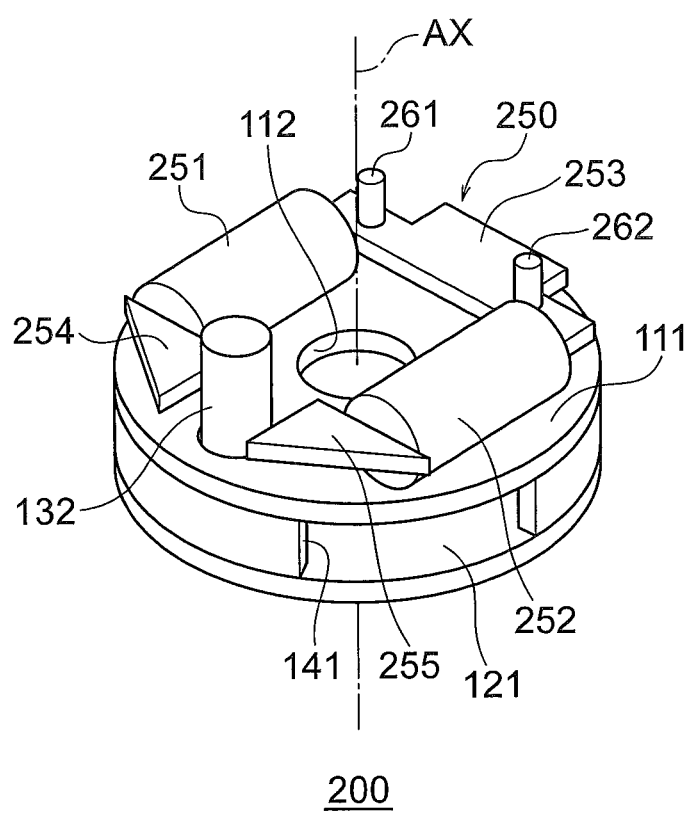
FIG. 4 is a perspective view showing the construction of the light control apparatus according to the first embodiment.

FIGS. 3 and 4 show the construction of a light control apparatus 200 according to a first embodiment. FIG. 3 is a plan view, and FIG. 4 is a perspective view.

The light control apparatus 200 according to the first embodiment includes two positioning members 261, 262 in addition to the structure of the light control apparatus 100 shown in FIGS. 1 and 2. In the following description, the components same as those in the basic construction of the light control apparatus 100 will be denoted by the same reference characters and will not be described in further detail.

As with the electromagnetic drive source 150 in the basic construction, an electromagnetic drive source 250 in the first embodiment includes a substantially rectangular U-shaped coil core (yoke) 253 and winding coils 251, 252 wound thereon. Two end parts 254, 255 of the coil core 253 are opposed to each other. The electromagnetic drive source 250 is arranged on the upper substrate 111 in such a way as to surround the optical aperture 112. The upper part of the magnet 132 passing through the rotary shaft hole 113 is located between and opposed to the two end parts 254, 255 of the coil core 253.

The positioning members 261, 262 in the form of two projections extending along the optical axis AX are fixed to the upper substrate 111. The positioning members 261, 262 are fitted in positioning holes 256, 257 provided in the portion of the coil core 253 on which winding coils are not wound, at positions distant from the magnet 132. It is preferred that the positioning members 261, 262 be made of a magnetic material, because the use of the positioning members 261, 262 made of a magnetic material do not lead to a decrease in the magnetic fluxes generated by the electromagnetic drive source 250, enabling stable driving.

In this configuration, the coil core 253 and the upper substrate 111 are in engagement with each other, whereby the position of the coil core 253 is restricted in directions in the plane of the upper substrate 111. In consequence, the distances between the magnet 132 and the end parts 254, 255 of the coil core 253 can be kept constant. In other words, the distance L1 between one end part 254 and the magnet 132 can be kept to be equal to the distance L2 between the other end part 255 and the magnet 132, and this relationship can be maintained.

The constant distances between the magnet 132 and the end parts 254, 255 of the coil core 253 make the rotational force acting on the magnet 132 uniform, enabling the drive blade 131 to rotate stably. Moreover, since positioning of the coil core 253 and the magnet 132 can be attained only by the fitting of the positioning members 261, 262, assembly of the apparatus can be made easy.

(Second Embodiment)

Figure 5:
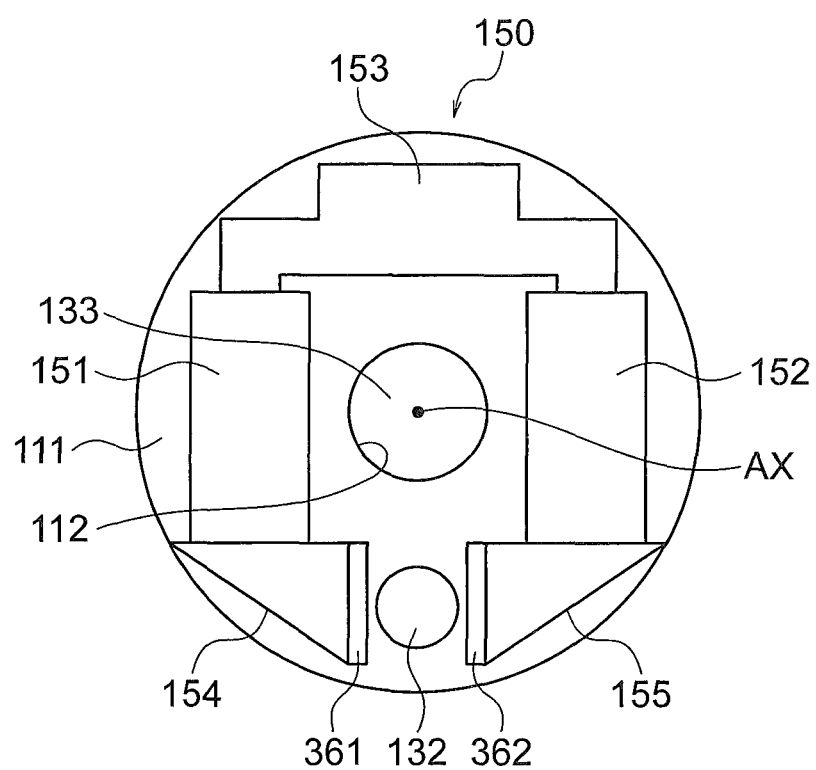
FIG. 5 is a plan view showing the construction of a light control apparatus according to a second embodiment.
Figure 6:
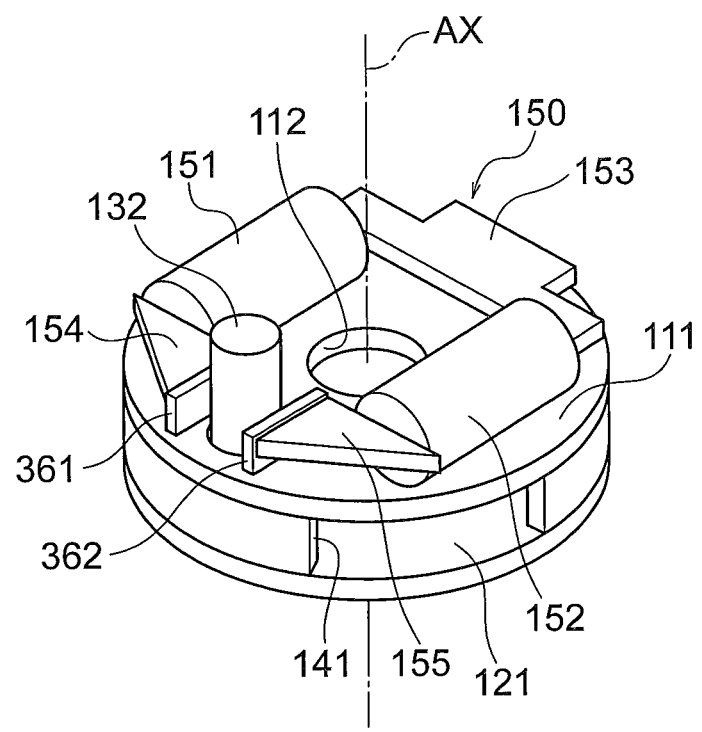
FIG. 6 is a perspective view showing the construction of the light control apparatus according to the second embodiment.

FIGS. 5 and 6 show the construction of a light control apparatus 300 according to a second embodiment. FIG. 5 is a plan view, and FIG. 6 is a perspective view.

The light control apparatus 300 according to the second embodiment differs from the light control apparatus 200 according to the first embodiment in that two positioning members 361, 362 are provided in the vicinity of the magnet 132. Apart from this, the construction of the light control apparatus 300 is the same as the light control apparatus 200 according to the first embodiment, and the same components will be denoted by the same reference characters and will not be described in further detail.

The positioning members 361, 362 are provided in the form of two walls on the upper substrate 111, between which the magnet 132 is located. The positioning members 361, 362 extend along the optical axis AX and are opposed to each other with the distances between the magnet 132 and them being equal to each other.

As described above, since the distances between the positioning members 361, 362 and the magnet 132 are determined beforehand, the distance between the magnet 132 and the coil core 153 can be kept constant by abutting the end parts 154, 155 on the sides of the positioning members 361, 362 respectively. In the case of the light control apparatus according to the first embodiment, it is necessary that not only the positioning members 261, 262 but also the holes 256, 257 of the coil core 253 be made at high precision. In contrast, in the case of the light control apparatus according to the second embodiment, the distance between the magnet 132 and the coil core 153 is determined directly only by the positioning members 361, 362, and therefore more stable driving can be expected.

The construction, operations, and advantages other than those described above are the same as those of the first embodiment.

(Third Embodiment)

Figure 7:
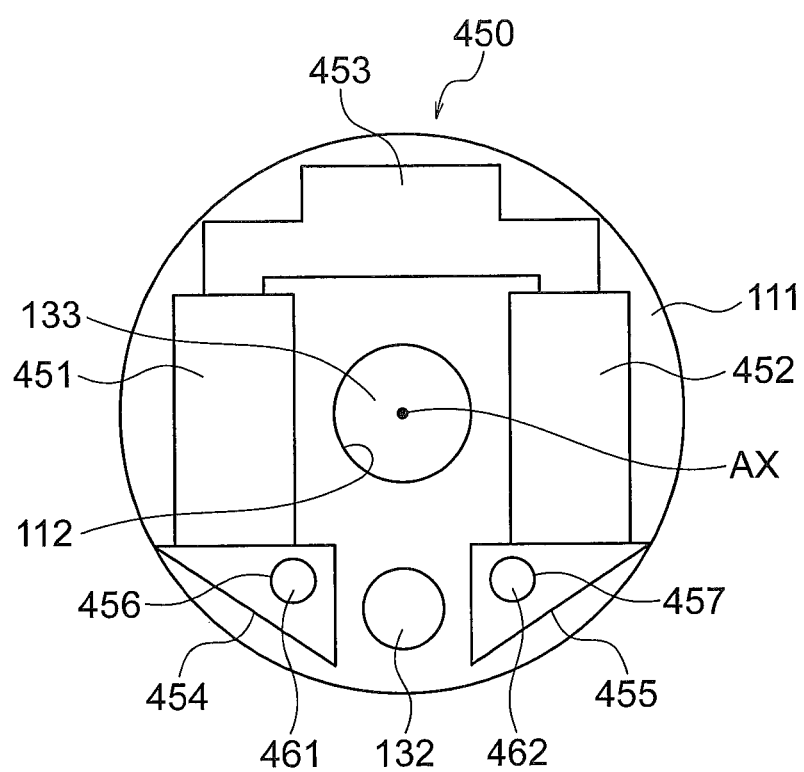
FIG. 7 is a plan view showing the construction of a light control apparatus according to a third embodiment.
Figure 8:
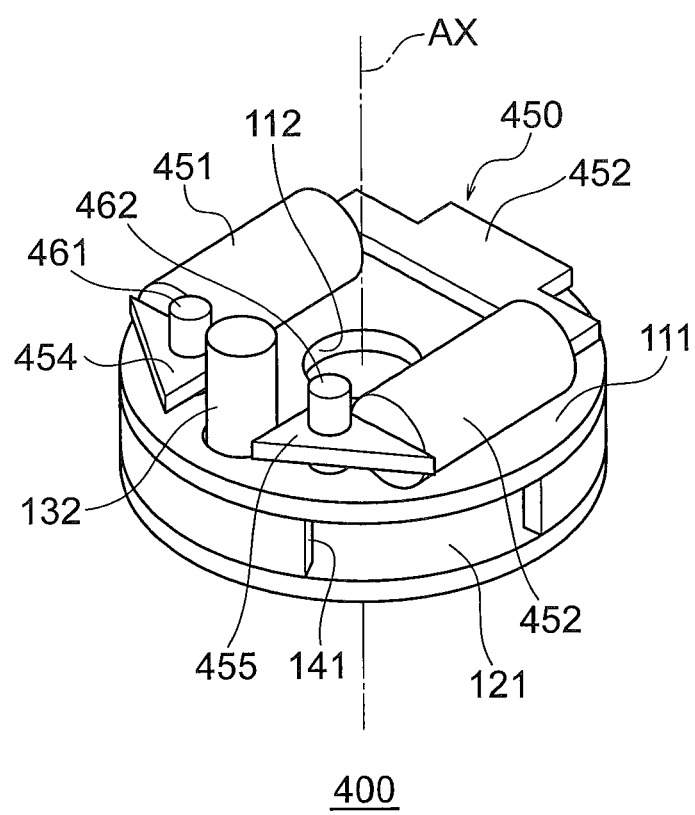
FIG. 8 is a perspective view showing the construction of the light control apparatus according to the third embodiment.
Figure 9:
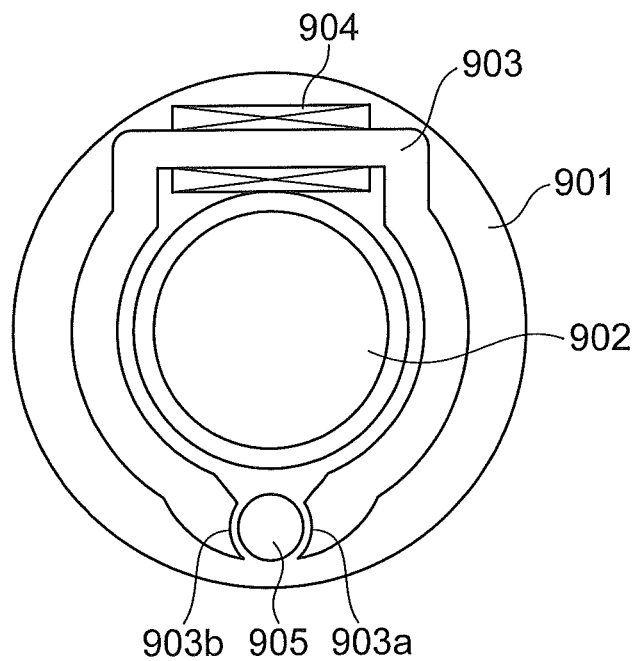
FIG. 9 is a plan view showing the construction of a conventional electromagnetic drive apparatus.

FIGS. 7 and 8 show the construction of a light control apparatus 400 according to a third embodiment. FIG. 7 is a plan view, and FIG. 8 is a perspective view.

The light control apparatus 400 according to the third embodiment differs from the light control apparatus 200 according to the first embodiment in that two positioning members 461, 462 are provided in the vicinity of the magnet 132. Apart from this, the construction of the light control apparatus 400 is the same as the light control apparatus 200 according to the first embodiment, and the same components will be denoted by the same reference characters and will not be described in further detail.

As with the basic construction of the electromagnetic drive source 150, an electromagnetic drive source 450 in the third embodiment includes a substantially rectangular U-shaped coil core (yoke) 453 and winding coils 451, 452 wound thereon. Two end parts 454, 455 of the coil core 453 are opposed to each other. The electromagnetic drive source 450 is arranged on the upper substrate 111 in such a way as to surround the optical aperture 112. The upper part of the magnet 132 passing through the rotary shaft hole 113 is located between and opposed to the two end parts 454, 455 of the coil core 453.

The positioning members 461, 462 are provided as two projections on the upper substrate 111, between which the magnet 132 is located. The positioning members 461, 462 extend along the optical axis AX and are opposed to each other with the distances between the magnet 132 and them being equal to each other. The positioning members 461, 462 are fitted in positioning holes 456, 457 provided in the portion of the coil core 453 on which winding coils are not wound, at positions near the magnet 132.

Positioning of the coil core 453 and the magnet 132 can be attained by engagement of the coil core 453 with the positioning members 461, 462. Since the positioning members 461, 462 are arranged in the vicinity of the magnet 132, the distance between the coil core 453 and the magnet 132 can be maintained more precisely, enabling more stable operations.

The construction, operations, and advantages other than those described above are the same as those of the first embodiment.

INDUSTRIAL APPLICABILITY

As described above, the light control apparatus according to the present invention is useful as a small-size optical component used in a small-size image pickup apparatus.

REFERENCE SIGNS LIST

100: light control apparatus
111: upper substrate
112: optical aperture
113: rotary shaft hole
121: lower substrate
122: optical aperture
123: rotary shaft hole
131: drive blade
132: magnet
133: incident light control member
141: spacer
150: electromagnetic drive source
151, 152: winding coil
153: coil core
154, 155: end part
200: light control apparatus
250: electromagnetic drive source
251, 252: winding coil
253: coil core
254, 255: end part
256, 257: hole
261, 262: positioning member
300: light control apparatus
361, 362: positioning member
400: light control apparatus
450: electromagnetic drive source
451, 452: winding coil
453: coil core
454, 455: end part
456, 457: hole
461, 462: positioning member

The invention claimed is:

1. A light control apparatus comprising:
an upper substrate and a lower substrate, each of which has an optical aperture;
at least one light control unit;
a spacer arranged between the upper substrate and the lower substrate to provide a space in which the light control unit can move; and
a drive unit arranged on the upper substrate to drive the light control unit, wherein
the drive unit includes a magnet arranged at a center of rotation of the light control unit and an electromagnetic drive source including a coil core and a winding coil, the coil core being arranged in such a way as to be opposed to the magnet,
a positioning member is provided on the upper substrate, the distance between the coil core and the magnet is kept constant by the positioning member, the positioning member being separate from the coil core.

2. A light control apparatus according to claim 1, wherein the positioning member restricts the position of the coil core in a direction in the plane of the upper substrate.

3. A light control apparatus according to claim 1, wherein the positioning member includes two positioning members.

4. A light control apparatus according to claim 1, wherein the positioning member includes a projection provided on the upper substrate and a hole provided in a portion of the coil core, and positioning is attained by fitting the projection into the hole of the coil core.

5. A light control apparatus according to claim 1, wherein the positioning member includes a projection extending along an optical axis direction on the upper substrate and exists on both sides of the magnet, and positioning of the coil core is attained by abutting the coil core on a side surface of the positioning member.

6. A light control apparatus according to claim 4, wherein the projection of the positioning member is arranged in the vicinity of the magnet.

7. A light control apparatus according to claim 4, wherein the projection of the positioning member is made of a magnetic material.

* * * * *